J. A. GALLAGHER & E. T. HERBOLTZHEIMER.
TROLLEY WHEEL GUARD.
APPLICATION FILED FEB. 19, 1915.

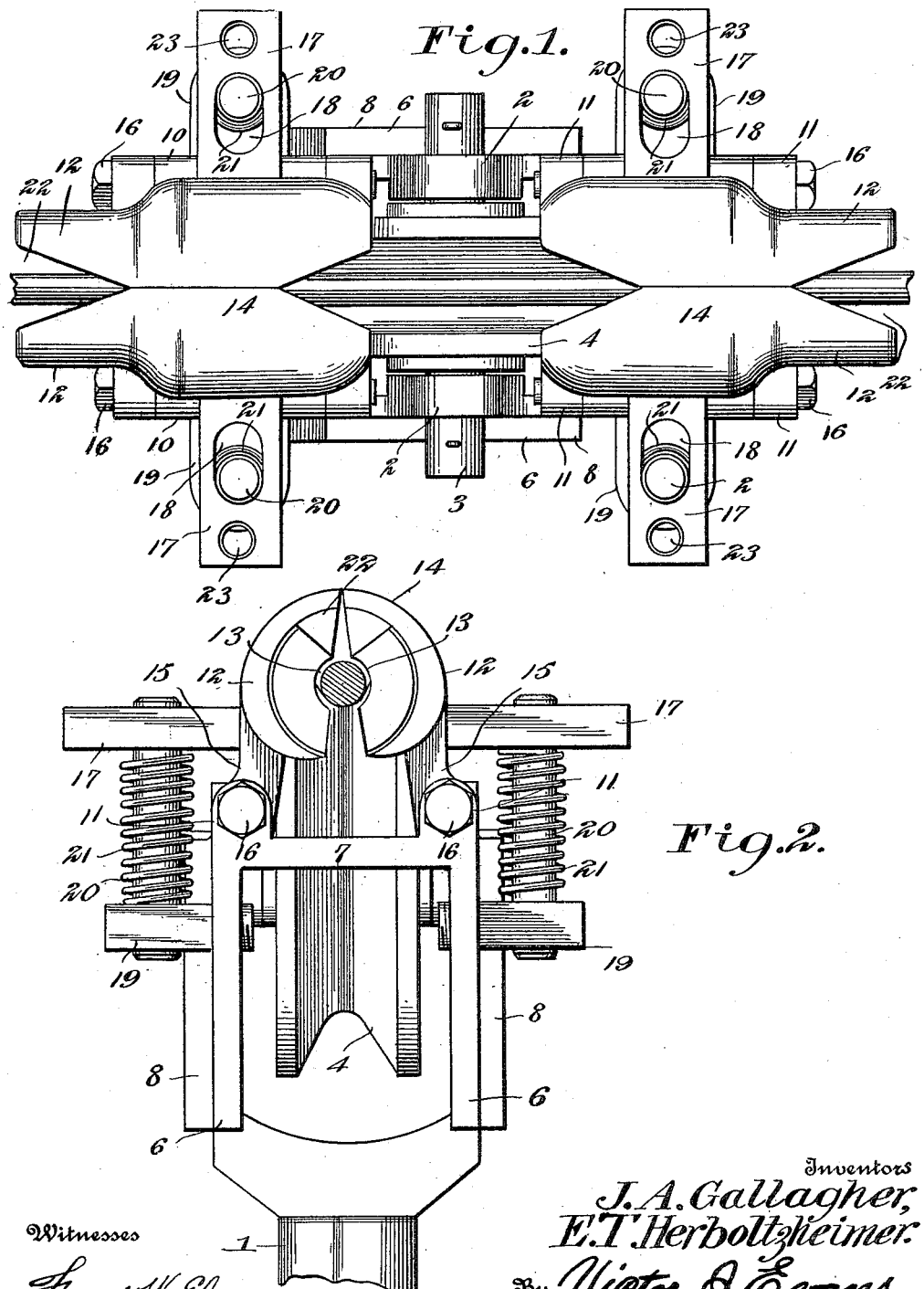

1,142,033.

Patented June 8, 1915.
2 SHEETS—SHEET 2.

Inventors
J.A. Gallagher,
E.T. Herboltzheimer.

Witnesses

UNITED STATES PATENT OFFICE.

JAMES A. GALLAGHER AND EDWARD T. HERBOLTZHEIMER, OF COLUMBUS, OHIO.

TROLLEY-WHEEL GUARD.

1,142,033.  Specification of Letters Patent.  Patented June 8, 1915.

Application filed February 19, 1915.  Serial No. 9,403.

*To all whom it may concern:*

Be it known that we, JAMES A. GALLAGHER and EDWARD T. HERBOLTZHEIMER, citizens of the United States of America, residing at Columbus, in the county of Franklin and State of Ohio, have invented new and useful Improvements in Trolley-Wheel Guards, of which the following is a specification.

This invention relates to improvements in trolley wheel guards whereby the trolley wheel will be held to the wire when rounding curves and passing supports and other obstacles.

In carrying out the present invention, it is our purpose to improve and simplify the general construction of trolley wheel guards and to provide a guard whereby the trolley wheel will be effectively and securely held in engagement with the wire when the car is rounding a curve or the trolley wheel passing a wire clamp or other support, thereby eliminating jumping of the wheel from the wire.

It is also our purpose to provide a guard of the class described which may be readily and quickly applied to the trolley harp, which will operate efficiently and effectively for its intended purpose and which will quickly and conveniently release the wheel from the wire when it is desired to lower the trolley pole.

With the above and other objects in view, the invention consists in the construction, combination and arrangement of parts hereinafter set forth in and falling within the scope of the claims.

Figure 3:
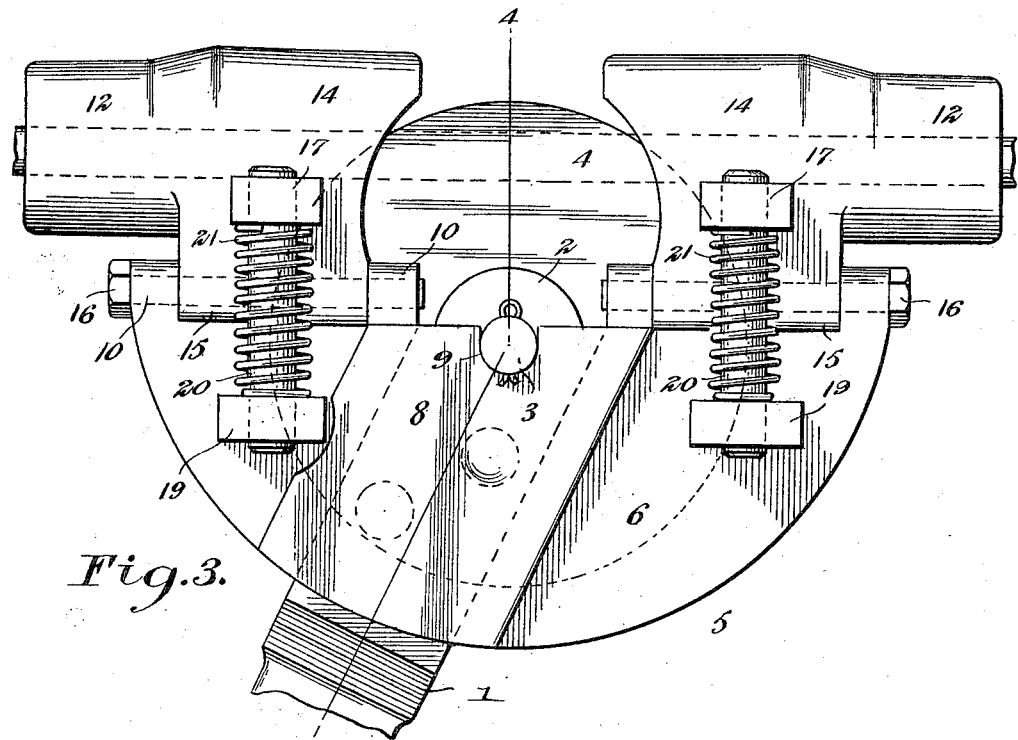
Figure 4:
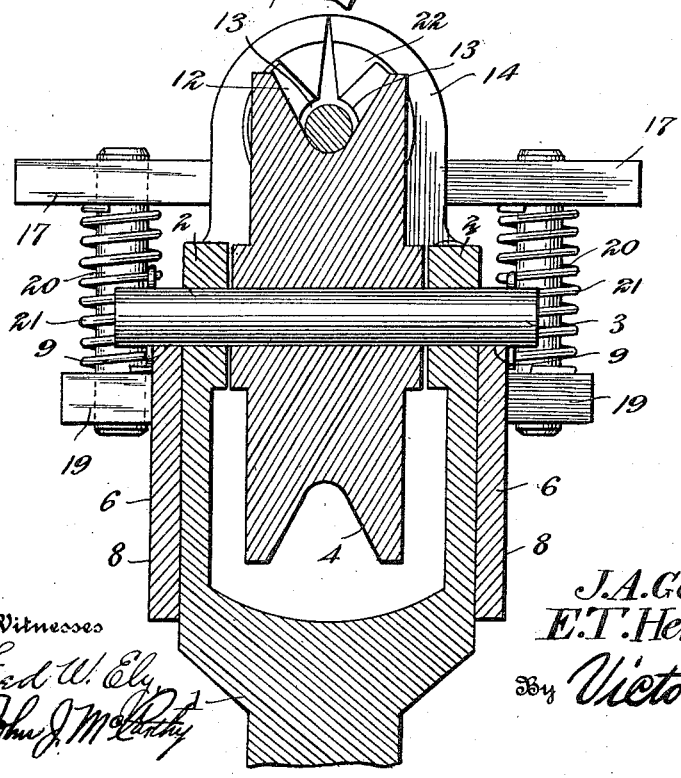

In the accompanying drawings; Figure 1 is a top plan view of a trolley wheel guard constructed in accordance with the present invention, the same being shown applied. Fig. 2 is a view in end elevation of the same. Fig. 3 is a view in side elevation thereof. Fig. 4 is a sectional view on the line 4—4 of Fig. 3.

Referring now to the drawings in detail, 1 designates a trolley wheel harp having the upper extremities of the legs thereof formed with horizontally alining bearings 2, 2 through which is passed an axle 3 carrying a trolley wheel 4, such wheel having the periphery thereof grooved as usual to receive the trolley wire.

5 designates a casting embodying segmental side plates 6 spaced apart in parallelism and connected to each other at the extremities of the straight edges thereof by means of cross bars 7 integral with the plates 6. The segmental shaped plates 6 are formed with diagonal offset portions 8 disposed approximately centrally of the respective plates and alining with each other and these offset portions receive the respective limbs of the trolley harp 1 and correspond with the inclination of the trolley pole when the latter is in elevated position so that the plates 6 will be arranged in a horizontal plane when the trolley wheel is in engagement with the wire. In the present instance, the offset portions of the plates 5 are formed with bolt holes alining with similar holes in the arms of the harp 1 to receive securing bolts whereby the casting will be rigidly secured to the harp of the trolley pole, and the upper edges of the offset portions of the plates are formed, centrally, with depressions or grooves 9 to receive the ends of the axle 3 of the trolley wheel, as clearly illustrated in Fig. 3. Formed on the upper edges of the plates 6, 6 adjacent to the forward ends thereof are pairs of lugs 10 respectively. The lugs of each pair are spaced apart longitudinally of the plates and formed with horizontally alining pivot openings. Also formed on the upper edges of the plates adjacent to the rear end portions thereof are pairs of lugs 11 respectively, the lugs of each pair being spaced apart longitudinally of the particular plate and formed with horizontally alining openings.

Disposed in advance of and behind the casting of the trolley wheel 4 are pairs of jaws 12 respectively. The confronting faces of the jaws of each pair are formed with longitudinally extending alining grooves 13 designed to receive the trolley wire as clearly illustrated in Fig. 2, and such faces of the jaws diverge outwardly from each other from the upper ends thereof toward the lower ends as shown in Fig. 2. Formed integral with the jaws of each pair and depending therefrom are webs 14 having the lower ends thereof formed with pivot knuckles 15, disposed between the respective adjacent pivot lugs 10 and formed with longitudinally extending bores respectively alining with the openings in the pivot lugs to receive pivot bolts 16. In the present instance, each pivot bolt 16 has one end threaded into one of the pivot lugs and the opposite end formed with a head.

Projecting outwardly from each web 14 is an arm 17 formed with an elongated slot 18 and projecting outwardly from the adjacent plate 6 below the arm 17 parallel therewith is an arm 19. Threaded into the arm 19 and projecting upwardly therefrom is a pin 20 having the upper extremity thereof projecting through the slot 18 in the arm 17. Encircling the respective pins 20 are coiled expansion springs 21 having the lower ends thereof in engagement with the respective arms 19 and the upper extremities engaging the arms 17 respectively. These springs 21 act to hold the confronting faces of the jaws 12 in engagement with each other and about the trolley wire, as clearly illustrated in Figs. 2 and 4.

In the present instance, the confronting faces of the jaws of each pair, at the opposite ends of the jaws, diverge outwardly of each other as clearly illustrated in Fig. 1 of the drawings to provide mouths 22, while the outer end portions of the arms 17 are formed with vertical openings 23 adapted to receive the upper extremities of ropes, the lower extremities of such ropes merging into one another and terminating within convenient reach of the operator of the car.

In practice, when the trolley pole is elevated under the action of its spring and the pole guided in its upward movement by the rope, the jaws 12 are swung about their pivotal connections with the plate 6 to open position against the action of the spring 21 so that the trolley wire may enter the space between the jaws and engage the groove in the trolley wheel. When the trolley wheel is in engagement with the wire and the pressure on the trolley rope relieved the springs 21 react and swing the jaws 12 into active position so that the grooves 13 receive the trolley wires. As the upper edges of the confronting faces of the jaws are in engagement with each other and the trolley wire disposed within the grooves in the confronting faces of the respective jaws the trolley wheel is held against the wire and jumping of the trolley wheel from the wire avoided.

When the trolley wheel passes a supporting clamp or other obstacle, such clamp enters the mouth 22 and passes between the forward jaws and in the continued movement of the trolley wheel releases the forward jaws and enters the mouth at the forward ends of the rear jaws. Thus, the pair of jaws are spread apart separately and one after the other against the action of the respective springs 21, thereby enabling the trolley wheel to pass the trolley wire supporting clamps. It will be noted that when the jaws of one pair are in open position under the action of the clamp or other obstacle the jaws of the remaining pair are closed, thereby insuring the holding of the wheel to the wire when passing the supporting clamps.

While we have herein shown and described the preferred form of our invention by way of illustration, we wish it to be understood that we do not limit or confine ourselves to the precise details of construction herein described and delineated, as modification and variation may be made within the scope of the claims without departing from the spirit of the invention.

We claim:

1. In a trolley wheel guard, the combination with the trolley harp, of a casting embodying plates secured to the respective limbs of said harp at opposite sides of the trolley wheel and interconnected, and jaws pivoted to the upper edges of said plates at the forward and rear end portions thereof and designed to receive the trolley wire in advance of and behind the trolley wheel and having the confronting faces thereof formed with coöperating grooves to accommodate the trolley wire and diverging outwardly from each other from the upper end edges toward the lower end edges.

2. In a trolley wheel guard, the combination with the trolley harp, of plates secured to the respective limbs of said harp at opposite sides of the trolley wheel, jaws pivoted to said plates at the forward and rear end portions thereof and designed to receive the trolley wheel in advance of and behind the trolley wheel, arms secured to the respective jaws and projecting outwardly therefrom and formed with elongated slots, arms secured to said plates below the first-mentioned arms respectively and projecting outwardly from the plates, pins secured to said last arms and projecting upwardly therefrom through the respective slots in the first-mentioned arms, and springs surrounding said pins and acting upon the first-mentioned arms to hold the jaws normally in closed position.

In testimony whereof we affix our signatures in presence of two witnesses.

JAMES A. GALLAGHER.
EDWARD T. HERBOLTZHEIMER.

Witnesses:
E. E. MOORE,
LULU LINDEMANN.